United States Patent
Kolesinski et al.

(10) Patent No.: US 7,285,219 B2
(45) Date of Patent: Oct. 23, 2007

(54) CHROMATOGRAPHIC SEPARATION MEMBER AND METHOD

(75) Inventors: Henry S. Kolesinski, Naples, FL (US); Robert S. Cooley, Wilmington, NC (US)

(73) Assignee: Prime Separations, Inc., Woburn, MA (US)

( * ) Notice: Subject to any disclaimer, the term of this patent is extended or adjusted under 35 U.S.C. 154(b) by 204 days.

(21) Appl. No.: 11/053,810

(22) Filed: Feb. 9, 2005

(65) Prior Publication Data

US 2006/0175260 A1 Aug. 10, 2006

Related U.S. Application Data

(60) Provisional application No. 60/600,139, filed on Aug. 10, 2004.

(51) Int. Cl.
*B01D 15/08* (2006.01)
(52) U.S. Cl. .............. 210/635; 210/656; 210/659; 210/198.2
(58) Field of Classification Search ............ 210/656, 210/635, 659, 198.2
See application file for complete search history.

(56) References Cited

U.S. PATENT DOCUMENTS

| | | | | | |
|---|---|---|---|---|---|
| 2,673,176 | A | * | 3/1954 | Whitney | 208/310 R |
| 2,678,132 | A | * | 5/1954 | Beard, Jr. | 210/658 |
| 2,881,127 | A | * | 4/1959 | Hetzel | 208/26 |
| 3,436,213 | A | * | 4/1969 | Norris | 423/6 |
| 4,529,496 | A | * | 7/1985 | Kruyer | 210/644 |
| 4,548,802 | A | * | 10/1985 | Dickey | 423/659 |
| 4,548,803 | A | * | 10/1985 | Dickey | 423/659 |
| 4,726,903 | A | * | 2/1988 | Dickey | 204/551 |
| 4,740,298 | A | * | 4/1988 | Andresen et al. | 210/198.3 |
| 4,740,310 | A | * | 4/1988 | Dickey | 210/649 |
| 4,747,951 | A | * | 5/1988 | Ellis | 210/649 |
| 5,030,352 | A | * | 7/1991 | Varady et al. | 210/502.1 |
| 5,037,533 | A | * | 8/1991 | Piedrahita et al. | 209/166 |
| 5,237,945 | A | * | 8/1993 | White | 112/420 |
| 5,256,298 | A | * | 10/1993 | Powell | 210/660 |
| 5,372,820 | A | * | 12/1994 | Jozefonvicz nee Dorgebray et al. | 424/499 |
| 5,395,521 | A | * | 3/1995 | Jagadeeswaran | 210/198.2 |
| 5,667,694 | A | * | 9/1997 | Cody et al. | 210/679 |
| 5,770,087 | A | * | 6/1998 | Reuter | 210/657 |
| 5,863,437 | A | * | 1/1999 | Ulbrich et al. | 210/656 |
| 6,039,876 | A | * | 3/2000 | Yang | 210/635 |
| 6,123,483 | A | * | 9/2000 | Langenecker | 405/128.75 |

(Continued)

FOREIGN PATENT DOCUMENTS

WO PCT/US00/04745 8/2000
WO PCT/US00/04786 8/2000

OTHER PUBLICATIONS

Gill (Biotech. Bioengineering, 56(5), (1997), pp. 538-545.*

(Continued)

*Primary Examiner*—Ernest G. Therkorn
(74) *Attorney, Agent, or Firm*—Gaetano D. Maccarone

(57) ABSTRACT

There is described a chromatographic separation member including a substrate carrying on at least one surface a thin layer of a chromatographically active capture material. Also described is a chromatographic separation method for separating a component of interest from a fluid utilizing the chromatographic separation member.

15 Claims, 3 Drawing Sheets

U.S. PATENT DOCUMENTS

| | | | |
|---|---|---|---|
| 6,565,752 B1* | 5/2003 | Baron et al. | 210/635 |
| 6,802,969 B2* | 10/2004 | Tanimura | 210/198.2 |
| 6,812,030 B2* | 11/2004 | Ozbal et al. | 436/50 |
| 2003/0042206 A1* | 3/2003 | Bouvier et al. | 210/660 |
| 2004/0035775 A1 | 2/2004 | Bonner et al. | 210/198.2 |

OTHER PUBLICATIONS

Snyder (Introduction to Modern Liquid Chromatography, John Wiley, New York, 1979, pp. 374-380).*

* cited by examiner

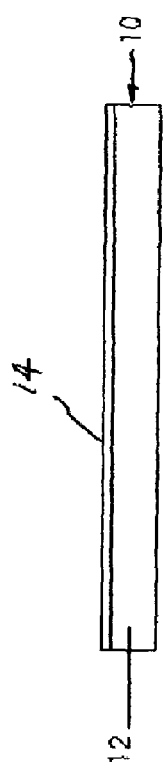
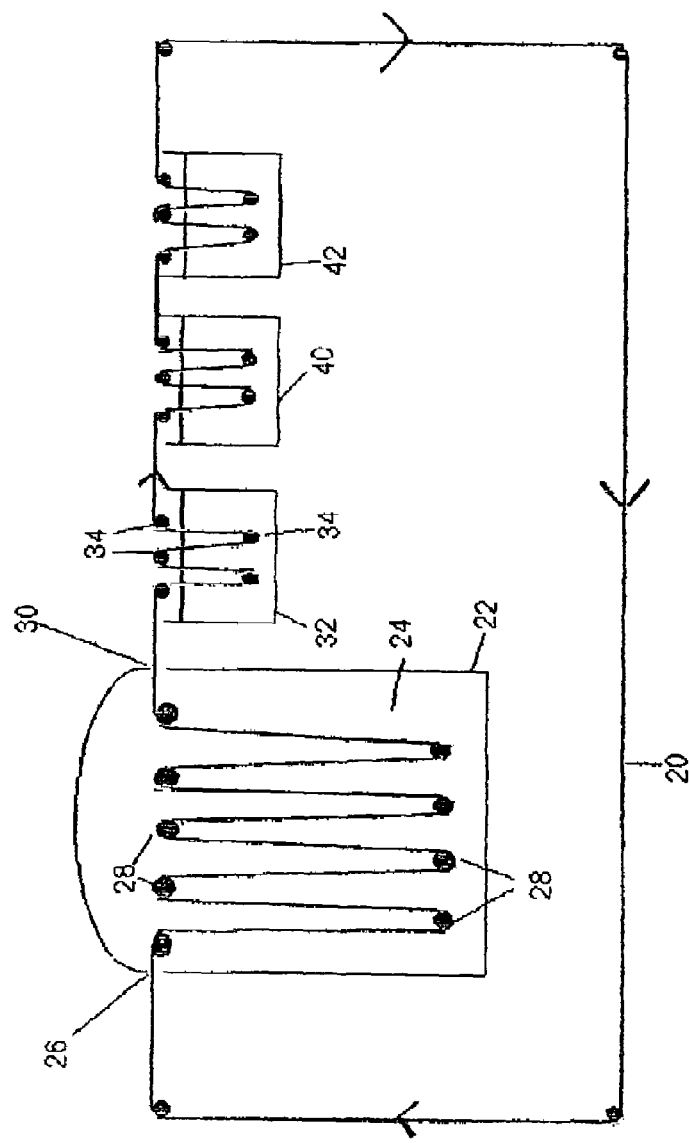

CHROMATOGRAPHIC SEPARATION MEMBER AND METHOD

REFERENCE TO RELATED APPLICATIONS

This application claims the benefit of provisional application Ser. No. 60/600,139, filed Aug. 10, 2004.

This application relates to a chromatographic separation member including a substrate carrying on at least one surface a thin layer of a chromatographically active capture material and to a method for separating, or removing, one or more components from a fluid which may contain a mixture of components utilizing the chromatographic separation member.

BACKGROUND OF THE INVENTION

The continuing surge in the development of biotechnology products, e.g., therapeutic proteins and industrial bioproducts such as organic acids, has created a requirement for new and economically viable separation and purification methods and apparatus. Biochemical technologies use enzymes or microorganisms to convert feedstock to the desired products, e.g., fermentation products. In some processes, such as those practiced in a separator reactor, removal of the product from the reaction vessel during the production process will increase the product yield by reducing the concentration of the self terminating material. In other processes it may be desirable to remove by-products and contaminants to improve efficiency and yield.

It may also be desirable to remove a product from a reaction vessel in its pure form, thus eliminating further conversion of the product into some other form, such as the formation of the salt of an organic acid. The conversion process normally generates waste streams that have to be disposed of in an environmentally sensitive manner.

Methods for performing fluid/fluid separations using a continuous web system have been disclosed previously. Several approaches have been taught using continuous webs packed with sorbent particles, coated with sorbent materials or sorbent fibers. Generally, these methods follow similar procedures wherein the web is passed through a solution containing the target molecules and the web then enters a de-sorption tank where the product is collected.

These approaches have not have not provided completely satisfactory results. For example, U.S. Pat. No. 5,256,298 reports that poor performance results when chemically interactive porous particulate materials are used. The '298 patent gives a brief description of the diffusion limitation of porous materials. Thus, web separation systems employing sorbent particulate materials have not provided the desired results.

Another area of great interest is that of water remediation processes to remove contaminants from and purify water and processes for the remediation of contaminated soil. Processes which utilize granulated activated carbon are known for water and soil remediation.

As the state of the art moves forward, efforts continue to develop improved and more efficient separation processes and materials for the removal of target molecules from fluids such as in water remediation processes, the removal of contaminants from soil and for the recovery of target molecules in the preparation of biotechnical and other products.

BRIEF SUMMARY OF THE INVENTION

According to one aspect of the invention there is provided a chromatographic web separation method which may be implemented with separation processes carried out with fluids such as water or fluids in bioreactors or other chemical processes to separate one or more desired components from fluids such as fermentation broths or other biomass mixtures. Generally, a fluid containing one or more target molecules is brought into contact with a chromatographic separation web, which is coated on one or both sides with direct capture or other chromatographically active functional material, to remove the desired target molecule(s) from the fluid. The fluid can be brought into contact with the chromatographic separation web by various methods including passing the web through the fluid or applying the fluid to the web such as by spraying or other fluid coating techniques, e.g., slot head coating techniques.

The fluid may be any from which it is desired to separate, or remove, one or more components. The fluid may be water containing one or more contaminants, a slurry of a solid in a fluid such as a slurry of soil in water, a fluid containing a mixture of biological products prepared in a bioreactor such as a fermentation broth, or a biomass mixture or a fluid containing other product mixtures prepared by other chemical processes. Where the fluid is a slurry such as of soil in water or a mixture of materials in a fluid, the soil or mixture of materials can be maintained in suspension with a mixer located in the fluid.

The chromatographic separation web can be a continuous web which can then be passed through a product de-sorption tank where the captured material is removed from the web and collected and the method repeated. Alternatively, the web may be taken up on a rewind roll and stored for treatment at a subsequent time to collect the captured material.

In one embodiment where a continuous web is utilized, after the captured material is removed and collected in a product de-sorption tank, the web is passed through a wash tank and an equilibration tank before being passed through the reactor or other product-containing vessel to begin the cycle again. In another embodiment the web may be unwound from a roll and after passing through the product-containing vessel, passed through a product collection vessel where the captured product is removed and collected and the web then wound onto a rewind roll. Alternatively the web containing the captured product material may be rewound directly onto the rewind roll and stored for later treatment and removal of the product.

In another aspect of the invention there is provided a chromatographic separation web which includes a substrate carrying on one or both sides a thin continuous layer of a capture material. Any capture chemistry can be used to separate the desired product(s) from the mixture. The web may be chemically modified using various interactive functional chemistries such as by depositing a coating of the capture material on the substrate or by direct reaction of the capture material with the substrate.

The capture material is a thin layer of a functionalized polymeric material which is chemically interactive with the desired product. The functionalized polymeric material includes a moiety which exhibits a high affinity and specificity for the product of interest. The functionalized polymeric material is "targeted", i.e., it specifically and efficiently interacts with and binds to the desired product. The binding between the desired product and the functionalized polymeric material may be covalent or non-covalent (e.g., hydrophobic interactions, electrostatic interactions, dipole interactions, van der Waals interactions, hydrogen bonding, etc.). Most often the binding is non-covalent.

Employing the chromatographic web, or belt, direct capture method of the invention, both for in situ and post-reaction product capture, will improve the production of bioproducts, reduce the cost of these products and provide environmentally improved processes. The direct capture, non-moving web separation method will simplify the capture of products from biomass containing extraneous matter without concern of fouling the capture support. Products obtained from plants, trees or fermentation broths may be captured without having to eliminate the debris normally associated with these processes. The direct capture, moving web method will also find utility in applications such as remediation processes including water and soil remediation processes. An example is the capture of metals or other components from industrial waste streams or remediating contaminated soil. The continuous moving web will be very efficient in capturing products from very dilute solutions. The sorption and de-sorption rates are generally surface related and are fast thereby providing fast and efficient separation methods.

BRIEF DESCRIPTION OF THE DRAWINGS

For a better understanding of the invention as well as other objects and advantages and further features thereof, reference is made to the following detailed description of various preferred embodiments thereof taken in conjunction with the accompanying drawings wherein:

FIG. 1 is a partially schematic side sectional view of one embodiment of a chromatographic separation member according to the invention;

FIG. 2 is a partially schematic side sectional view of one embodiment of a chromatographic web separation method according to the invention;

DESCRIPTION OF THE PREFERRED EMBODIMENTS

Figure 3:
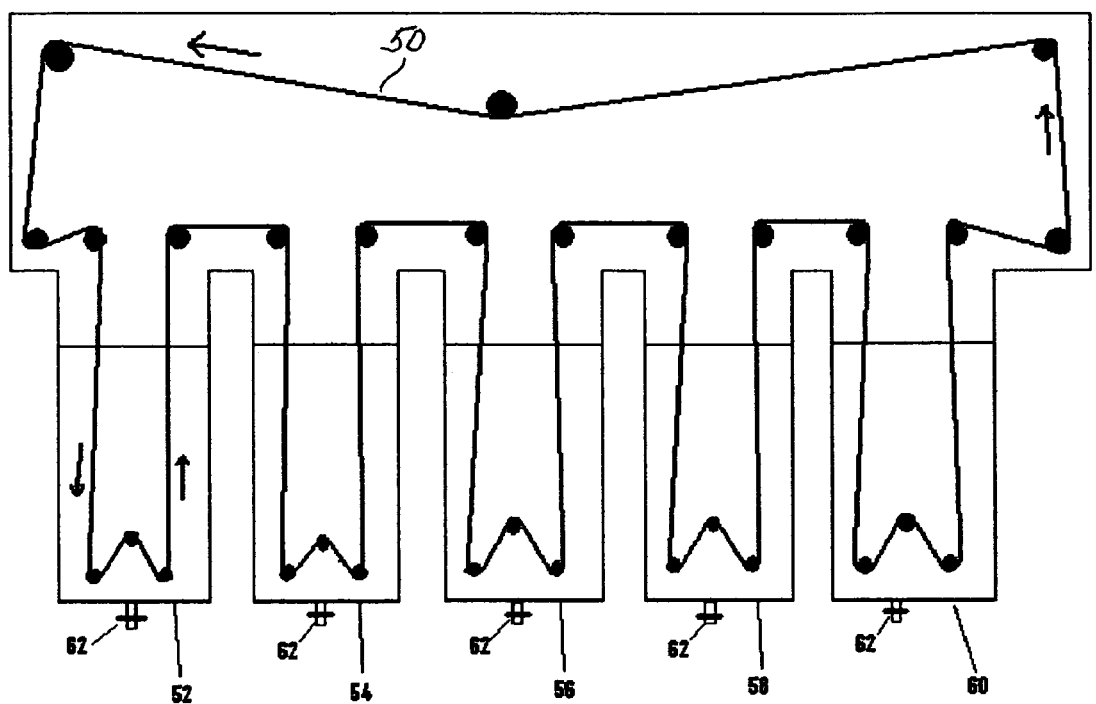
FIG. 3 is a partially schematic side view of another embodiment of a chromatographic web separation method according to the invention.

As described previously, the chromatographic web separation method employs a chromatographic separation member, which may be in the form of a web, or belt, which has a substrate carrying on one or both sides thereof a capture material functionalized with specific capture chemistries. The present separation method may employ a continuous recycling configuration for the web. In another embodiment there are utilized web unwind and rewind rolls. In this embodiment the web material is pulled from the unwind roll by a drive mechanism on the rewind roll with the web passing through a container or containers holding mixtures containing target materials. The web containing the captured compounds may be subjected to drying conditions, if desired, and taken up on the rewind roll and stored for subsequent treatment of the web material at a later time.

The chromatographic separation member includes a substrate which has adhered to one or both surfaces a thin layer of a capture material. The layer of capture material may be a substantially uniform continuous layer or a patterned layer.

Referring now to FIG. 1 there is seen a chromatographic separation member 10 according to the invention. The member 10, which is preferably in the form of a web. or belt, includes a substrate, or support, 12 and a thin layer 14, e.g., from about $0.25\mu$ to about $3.0\mu$ thick, of a functionalized polymeric material. The substrate 12 may be of any suitable material including naturally-occurring and synthetic materials. Typical suitable materials include synthetic organic materials, metallic materials, fibrous materials such as non-woven and woven fibers, membrane structures and any material capable of being formed into a self supported web, or sheet. Examples of useful synthetic polymeric materials are polyesters, cellulosics, polyamides, polyolefins, polyvinyl polymers, etc. Metal films such as aluminum may be employed. Films of metallized plastics are also useful. Many types of woven and non-woven fabrics would find utility as suitable belt/web materials as would other membrane structures.

The substrate 12 may be of any thickness which is sufficient to provide the mechanical strength such that the web can perform its function according to the invention. The substrate may also be subcoated with a suitable material to enhance adhesion of the capture material to the surface of the substrate. A layer of a hydrophilic polymer such as gelatin may be coated on the surface of the substrate for this purpose.

The chemical functionalization of the belt/web materials, can be by coating and immobilizing functional polymers and/or functional monomers onto the surface(s) of the supports. Coating can be accomplished by techniques known to those skilled in the art. The web substrate may be coated using a slot head coater or by dip coating, gravure roll, reverse roll or other coating methods. The preferred coating method in any particular instance will be dependent primarily on the type of support and material and application. In some instances, direct chemical reaction with the support material may be the preferred technique to chemically modify the belt/web support material with the capture material. For example, where an organic polymeric material is used as the substrate, it may be preferable to employ direct chemical modification of the substrate by reaction of the substrate material with a functional monomeric or polymeric material.

The capture material is preferably cross-linked to the substrate to maintain its adherence to the substrate. Di- or multifunctional reagents may be used to chemically cross-link the polymeric material.

The chemical modification of the belt/web supports is generally accomplished by coating and immobilizing functional polymers and/or monomers onto the surface(s) of the substrate. Co-polymers containing monomers that provide chemical functionality and monomers that contribute to the immobilization of the polymer film, are coated onto the surface of the belt/web supports. Immobilization may be accomplished by various methods, preferably by thermal or photo-chemical mechanisms. RF plasma polymerization may be utilized to functionalize the surface of the substrate material.

Techniques for the coating, cross-linking and immobilization of functionalized polymeric films are well known to those skilled in the art and are described, for example, in the micro-lithography technology literature which finds applications in the graphic arts, printed circuit board, integrated circuit and chromatography/separation areas.

The casting of solutions and mixtures of functional monomers for subsequent polymerization and cross-linking has been demonstrated in the preparation of electrophoretic and chromatographic media. Direct reaction to functionalize a substrate material can be accomplished by those skilled in the art by employing well known chemical reactions to attach appropriate ligands to the substrate material. Grafting techniques can also be used.

As mentioned above, the chromatographically active, functional polymer layer 14 is preferably from about 0.25μ to about 3.0μ in thickness. However, it will be recognized that the thickness of the functional polymer layer may be less or greater in appropriate instances.

One advantage of the direct reaction of the capture material with the substrate is the avoidance of any potential adhesive or cohesive failure of the functional material film on the substrate. However, there are known chemical reactions that produce highly reactive species, e.g., nitrenes and other free radicals by photo-chemical or thermal activation which can be exploited to bind the functional polymeric film to the substrate material thereby substantially reducing or minimizing the possibility of adhesive or cohesive failure.

Examples of chemical modification include ion exchange chemistries (IEX), affinity, immobilized metal affinity chromatography (IMAC), chiral phases, hydrophobic interaction (HIC) reverse phase (RP), lower critical solution polymers (LCST), metal chelating polymers, and magnetic phases and Molecular Recognition Imaging.

Typical suitable functional polymeric capture materials include polybutadiene for reverse phase interactions. Functional polymer capture materials which undergo ion exchange interactions are preferred. Preferred functional capture materials are copolymers of pyridinium ylide with cation and anion exchange monomers such as sulfopropyl methacrylate, potassium salt, and p-vinylbenzylammonium chloride. The pyridine ylide monomer, under photochemical or thermal conditions, generates a reactive species. For techniques for irradiating polymers containing pyridinium ylide moieties see U.S. Pat. No. 4,670,528. For chromatographic separation techniques utilizing N-acyl diazepine polymers containing pyridinium ylide moieties see U.S. Pat. No. 5,159,039.

Another advantage of the chromatographic web separation method is that the thickness of the functional capture film on the web support may be adjusted to increase or decrease the amount of capture as desired. Thus, for example, the ligand densities of ion exchange chemistries can be modified as required thereby improving the capture efficiency of specific molecules in the mixture. Given the same surface area, it has been shown that when the thickness of a polymer film containing ion-exchange moieties is increased the amount of target molecules captured is increased.

The chromatographic separation method of the invention may be carried out with a stand alone apparatus or be incorporated as an integral part of any type of reactor for removal of products during the reaction process.

The broad based utility of the chromatographic separation method will find many diverse applications both in laboratory and industrial environments, including in the separation and collection of the desired compound in the synthesis of chemical compounds, the separation and purification of biochemical products from mixtures such as fermentation products and in water and soil remediation processes.

The apparatus by which the chromatographic separation method is carried out may include several product de-sorption tanks or other methods can be utilized to desorb the products from the web. The method thus allows for the separation of various products which were captured by the chromatographically active functional polymer film on the web as it passes through the product mixture. In addition to traversing the web through several product de-sorption tanks, the captured product can be removed at washing stations where the web can be contacted with a molecule-specific interactive de-sorption fluid, such as by spraying the fluid onto the web, to release the target product for collection.

A step gradient technique can be used to separate and purify multi-component mixtures using standard chromatographic column formats. An example would be the separation and purification of a protein mixture that has been injected on a chromatography column, by using a step gradient of solvent or buffers. If an ion exchange method is employed for separation of products using a step gradient, as the conductivity of the system is increased in a step wise manner, the ionic interaction of product with the ion exchange surface is effected with the subsequent release of said product at that particular ionic conductivity, into the flowing buffer, leaving the more strongly interactive product species bound to the capture surface, only to be released as the conductivity of the system is further increased.

The step gradient technique can be employed very effectively with the moving web separation method of the invention. In a continuous recycling mode, the captured products will be separated and purified from the product-containing vessel, until the desired products of the reaction vessel are substantially completely separated and collected in de-sorption vessels, each containing specific concentrations (such as increasing conductivity, pH. etc.) of de-sorption buffers or solvent mixtures. The advantageous separation method of the invention would replace the arduous task of repeated injections onto a chromatography column to separate the mixture components.

It can be seen that the chromatographic separation method of the invention is a continuous method in contrast to the batch type method normally associated with chromatography column separations. The chromatographic separation method is particularly useful in the capture of desired products from dilute solutions or dispersions.

In another embodiment of the invention the capture material is applied to the web support in a patterned manner, e.g., by gravure coating techniques, such as in the form of lines, dots or other patterns. Providing the film of capture material in a patterned arrangement significantly increases the total surface area of the capture material which is available to interact with the desired product to be separated from the mixture of components. The patterned layer of capture material is a continuous layer with thickness variations in accordance with the particular pattern.

Where the layer of capture is provided in a patterned arrangement it is preferred to initially deposit a thin, substantially uniformly-thick layer of the capture material followed by depositing a patterned layer of the material thus forming an overall continuous patterned layer.

Such patterns, e.g., lines or dots., may be on the order of nano- or micro-sizes or larger. The preferred size will be primarily dependent upon the mechanism of formation of the patterned or imaged coating and requirements. For example, if it is desired to generate a molecular image the resolution requirements far exceed those necessary to produce lines or dots to increase surface area.

The continuous patterned capture film can be formed directly on the web supports by specific coating techniques. Alternatively, a substantially uniform layer of the capture material can be deposited on the support and then imaged using digital, electron beam, ultraviolet light or other photochemical methods in accordance with the desired pattern. The unexposed area of the capture film can then be removed leaving behind a well defined image.

An example of the use of a pattern of the capture material on the separation member support is where molecular recognition is the interactive mechanism to capture the target molecules.

The chromatographic separation member can be reused or discarded and replaced after each use in which case cleaning in place procedures can be eliminated. The particular embodiment selected in any specific instance may be dictated by economic considerations.

The method of the invention will now be described with respect to the embodiment thereof wherein the separation web is passed through a fluid. Referring now to FIG. 2 there is seen an endless recirculating, chromatographically interactive web 20 which includes a support having adhered to one or both surfaces thereof a thin film of a capture material. The web 20, which may be of any of the support and capture materials described previously, travels in the direction illustrated by the arrow and enters a vessel, or container, 22 such as a bioreactor containing a mixture of components in a fluid 24, through an opening 26 in the vessel. As shown, the web is passed through the fluid supported by a series of idler, or tension rollers 28. It will be apparent that the web drive and tracking mechanism may use tension rollers, sprocket feed devices or any other useful web drive elements to drive and track the web. Many such devices are known in the art.

The web 20 may be wound around any number of rollers 28 in vessel 22, that is, any desired length of web 20 may be present in the container at any time. The rate of travel of the web in vessel 22 can be adjusted as desired. The web 20 may be of any desired width and any desired overall length. As described above, the desired component, or product, in the fluid 24 is captured by the functional material on the surface of the web.

The web 20 carrying the desired component, or product, exits from vessel 22 through an opening 30 and enters a product de-sorption tank 32 where the web is guided by a series of idler, or tension, rollers 34. The captured product is desorbed from the surface(s) of web 20 and subsequently removed from tank 32 and collected. The captured product is desorbed from the web by any of the de-sorption techniques previously described.

As described above with respect to the product-containing vessel 22, the web 20 may be wound around any number of rollers 34 in de-sorption tank 32 and any desired length of web 20 may be present in the de-sorption tank at any time. The rate of travel of the web in de-sorption tank 32 can be adjusted as desired. Further, although one de-sorption tank is shown in FIG. 1, it will be understood that the web 20 may be passed through any number of de-sorption tanks as necessary to remove and collect the desired product separated from the fluid mixture by web 20.

The web 20 then is passed through a wash tank 40 and equilibration tank 42 before being re-circulated through vessel 22 to begin the separation cycle again. Any number of separation cycles may be carried out in order to recover the desired amount of product from the product-containing vessel 22.

Referring now to FIG. 3 there is illustrated another embodiment of the invention wherein a web 50, which travels in the direction of the arrow, is passed through a plurality of vessels 52-60. In this embodiment vessel 52 is a reaction vessel, vessel 54 is a product collection vessel and vessels 56, 58 and 60 are wash and equilibration vessels. Vessels 52-60 also can include means for conveniently emptying the vessels such as stopcocks 62.

In another embodiment of the method of the invention, the fluid mixture is applied to the chromatographic separation member by such as by spraying the mixture thereon or by applying the fluid to the separation member by other fluid coating techniques including slot head coating processes. The sequence of steps following the application of the fluid to the separation member is generally the same as those described above, for example passing the separation member through a de-sorption vessel to remove and collect the target molecule and an equilibration vessel.

An advantage of applying the fluid to the surface of the separation member is that the path of the target molecule to the surface of the capture material is minimized and there is more immediate contact of the target molecule with the surface of the capture material.

Figure 4:
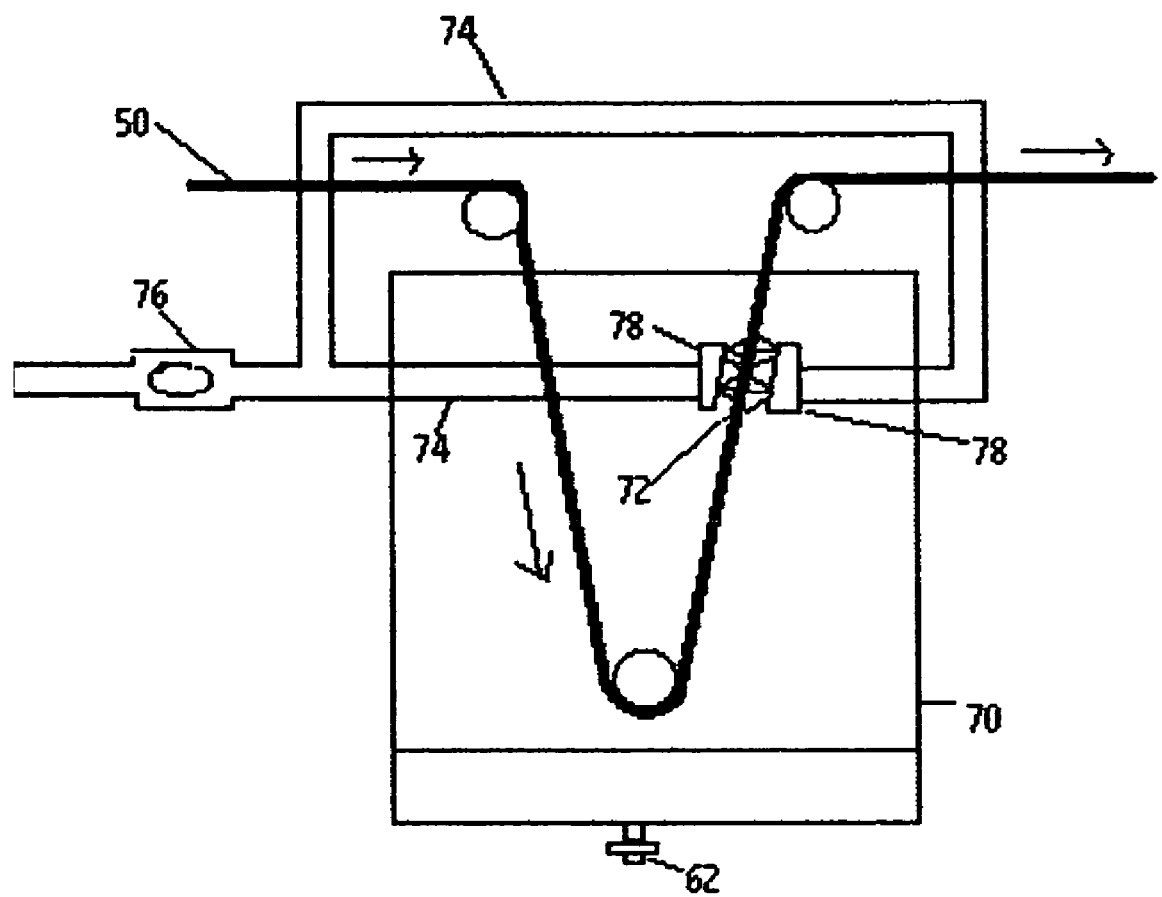
FIG. 4 is a partially schematic side view of another embodiment of a chromatographic web separation method according to the invention.

According to a preferred embodiment of the fluid application aspect of the invention, which will be described with respect to FIG. 4, the fluid is applied to the separation member 50 when the separation member is in container 70, preferably at a point where the member is traveling in the upward direction, e.g., at point 72. The fluid is propelled through tube 74 by pump 76 and is applied to the surface of the separation member by means of spray heads 78. According to this embodiment, the fluid continuously comes into contact with capture material as the member travels through the vessel. Fluid from which sufficient target molecules, such as contaminants in water, can be removed from the container 70 by stopcock 62. Although the separation member has been shown as being wound around one idler roller in container 70, it will be understood that the web 50 may be wound around any number of rollers in vessel 70, that is, any desired length of web 50 may be present in the container at any time as has been described with respect to the embodiments illustrated in FIGS. 2 and 3. The web 50 can then be subjected to any of the sequence of steps described above including collection of the target molecule, washing, equilibration, etc.

The separation members and methods of the invention can be advantageously utilized for water and soil remediation to remove contaminants such as creosote, polycyclic aromatic hydrocarbons (PAH), polychlorinated biphenyls (PCB) or other molecules.

EXAMPLES

The invention will now be described further in detail with respect to specific preferred embodiments by way of examples, it being understood that these are intended to be illustrative only and not limiting of the scope of the invention. Various changes and modifications to the disclosed embodiments will be apparent to those skilled in the art. Such changes and modifications, including without limitation, those relating to the materials, process parameters and/or methods of the invention may be made without departing from the spirit of the invention and the scope of the appended claims. All parts and percentages recited are by weight unless otherwise specified.

Example I

A chromatographic separation member according to the invention was prepared by coating, with a slot-head coating apparatus, an approximately 1μ thick layer of a strong cation exchange (SCIEX) copolymeric capture material on the gelatin-coated surface of a subcoated Mylar© (polyethylene terephthalate) film. The SCIEX copolymeric capture material was prepared by copolymerizing 2 parts of a pyridinium ylide monomer (shown at column 13, lines 60-65 of U.S. Pat. No. 4,670,528) and 8 parts sulfopropyl methacrylate, potassium salt (available from Aldrich Chemical Co.) according to the polymerization techniques described in the '528 patent.

A sample of the separation member, an approximately 1½" by 3½" section of the separation member, was then exposed for about 20 minutes to a 5.5 watt, 2⅛" long, UV lamp, available from Ace Glass Co., New Jersey (Part No. 90-0012-01) to cross-link the polymer.

Subsequently, the sample of the separation member was washed with a solution of 20 millimolar (mM) potassium di-hydrogen phosphate ($KH_2PO_4$) ("buffer A") two times in a crystallizing dish.

A protein solution was prepared by dissolving cytochrome C (17 mg) and lysozyme (17 mg) in buffer A (40 mL).

The protein solution (10 mL) was added to the sample having the SCIEX capture material in a crystallizing dish to cover the sample. The sample was swirled in the protein solution for about 3 minutes. The protein solution was then decanted from the dish and the sample washed two times with buffer A (20 mL) to remove any extraneous material.

The sample was then swirled in 10 mL of a solution of buffer A (60%) and buffer B (20 mM $KH_2PO_4$/0.5 molar sodium chloride. The resulting solution was analyzed by high performance liquid chromatography HPLC) at 280 nm. HPLC analysis showed that only one component of the lysozyme and cytochrome C components was removed from the separation member by the above-described buffer mixture.

The sample was then inserted into buffer B (10 mL) for about one minute and the sample removed and analyzed by HPLC at 280 nm. HPLC analysis showed that only the other of the cytochrome C and lysozyme components was removed from the separation member with buffer B.

The results show the capture by the chromatographic separation web of the desired proteins from solution and the ability to release and recover the captured proteins from the member discriminately.

Example II

This example illustrates the capture and release of target molecules by reverse phase materials according to the invention.

A solution of 4-(vinyloxy)butyl stearate (0.5 g) in methylene chloride (15 mL) was prepared. An approximately 15×80 mm piece of double sided Mylar (Transilwrap LJ112, commercially available from Transilwrap Co., Bethlehem, Pa.) was dipped into the solution for about 10 seconds and then slowly withdrawn and dried with a flow of warm air.

The film was washed with acetonitrile and then with methanol and then dried as described above.

This capture member according to the invention, coated with a reverse phase capture material, was then utilized in a number of extractions of target molecules from aqueous mixtures according to the following procedure:

The reverse phase-coated chromatographic separation member was immersed in a solution or mixture containing target molecules in a test tube for a few minutes. The member was then removed from the solution or mixture and washed several times with water.

The member was then placed in a test tube containing ~1 mL acetonitrile to desorb any captured molecule. Subsequent HPLC evaluation @ 210 nm of the acetonitrile solution demonstrated whether capture and release of the target molecule had occurred. The capture or lack of capture is indicative of the hydrphobicity of the reverse phase-coated member and the target molecule. The appropriate HPLC controls and blanks were run.

The following results of extraction performance by the reverse phase-coated separation member were obtained

| Target Material | Result |
| --- | --- |
| caprolactam (from waste stream) | captured and released |
| oleic acid | captured and released |
| butyric acid | not captured |
| maleic acid | not captured |

These results show that the chromatographic separation members and method of the invention can be adapted to capture target molecules selectively based on the hydrophobicity of the capture material and the target molecule.

Example III

This example illustrates the capture and release of target molecules by strong anion exchange (SAIEX) materials according to the invention.

A strong anion exchange copolymer was prepared by copolymerizing 2 parts of the monomer described in Example I and 8 parts m-isopropyl-$\alpha,\alpha$, dimethylbenzyl isocyanate (available from American Cyanamid). The copolymer (at approximately a 1% concentration) was dissolved in water containing a very small amount of Triton X-100, a surfactant available from (Baker Analyzed®).

A 1×2" piece of Mylar film, coated on one side with gelatin, was dipped in the polymer solution for about 10 seconds, slowly withdrawn and dried with a flow of warm air. The dried polymeric capture layer was then cross-linked by exposure to ultraviolet light by the procedure described in Example I for ten minutes to crosslink the capture material. Subsequently the member was washed with water and dried.

A sample solution was prepared by dissolving maleic acid (1 g) in buffer A (20 mL), adjusted to pH 8.0 with $NaHCO_3$.

The separation film was dipped in the maleic acid solution for a few seconds, removed and washed with buffer A solution two times to remove any extraneous material. The separation member was then extracted with buffer B (1 mL) to desorb the target molecule.

The resulting solution was evaluated by HPLC @ 210 nm. The HPLC analysis showed capture of maleic acid by the separation member and subsequent release therefrom in the extraction with buffer A.

Although the invention has been described in detail with respect to various preferred embodiments, it will be understood that these are intended to be illustrative only and the invention is not limited thereto, but rather that those skilled in the art will recognize that variations and modifications may be made therein which are within the spirit of the invention and the scope of the appended claims.

What is claimed is:

1. A method for separating a component of interest from a fluid comprising
   (a) applying to a chromatographically active separation member comprising
      (i) a substrate having first and second opposed surfaces; and
      (ii) a continuous film of a chromatographically active functional polymeric material carried by said first surface, said continuous film having a thickness of from about 0.25 micron to about 3.0 microns;

a fluid containing at least one component of interest, said chromatographically active functional polymeric material being capable of capturing said component of interest;

wherein at least a portion of said component of interest is bound to said chromatographically active functional polymeric material carried by said first surface;

(b) removing said fluid from said chromatographically active separation member having bound thereto said component of interest;

(c) releasing said component of interest from said chromatographically active separation member;

(d) applying an equilibration fluid to said separation member; and (e) repeating steps (a)-(d) at least one additional time.

2. The separation method as defined in claim 1 and further including the step of collecting said component of interest.

3. The separation method as defined in claim 1 wherein said chromatographically active separation member comprises a continuous re-circulating web.

4. The separation method as defined in claim 3 and further including the step of:
collecting said component of interest.

5. The separation method as defined in claim 1 wherein
step (a) comprises passing said chromatographically active separation member through said fluid containing at least one component of interest;
step (b) comprises removing said chromatographically active separation member from said fluid; and
step (d) comprises passing said chromatographically active separation member through said equilibration fluid.

6. The separation method as defined in claim 1, wherein step (a) comprises applying said fluid to said chromatographically active separation member by spraying said fluid on said separation member.

7. The separation method as defined in claim 1 wherein said fluid is a fermentation broth comprising a mixture of biological materials.

8. The separation method as defined in claim 1 wherein said fluid is water containing at least one contaminant.

9. The separation method as defined in claim 1 wherein said fluid comprises soil in water.

10. The separation method as defined in claim 1 wherein said continuous film has a substantially uniform thickness.

11. The separation method as defined in claim 1 wherein said chromatographically active separation member further includes a continuous film of a chromatographically active functional polymeric material carried by said second surface.

12. The chromatographically active separation method as defined in claim 11 wherein said chromatographically active functional polymeric material carried by said first surface and by said second surface are the same.

13. The chromatographically active separation method as defined in claim 1 wherein said separation member further includes a layer of a hydrophilic polymer adhered to said first surface of said substrate and wherein said continuous film of chromatographically active functional polymeric material is deposited on said hydrophilic polymer layer.

14. The chromatographically active separation method as defined in claim 13 wherein said chromatographically active functional polymeric material is crosslinked to said substrate.

15. The chromatographically active separation method as defined in claim 1 wherein said chromatographically active functional polymeric material is crosslinked to said substrate.

* * * * *